No. 804,879. PATENTED NOV. 21, 1905.
W. A. PARRISH.
DETACHABLE LINK.
APPLICATION FILED MAR. 8, 1904.
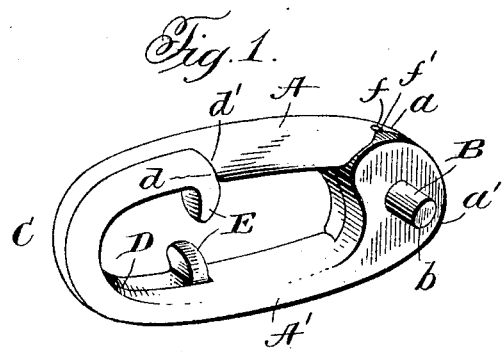
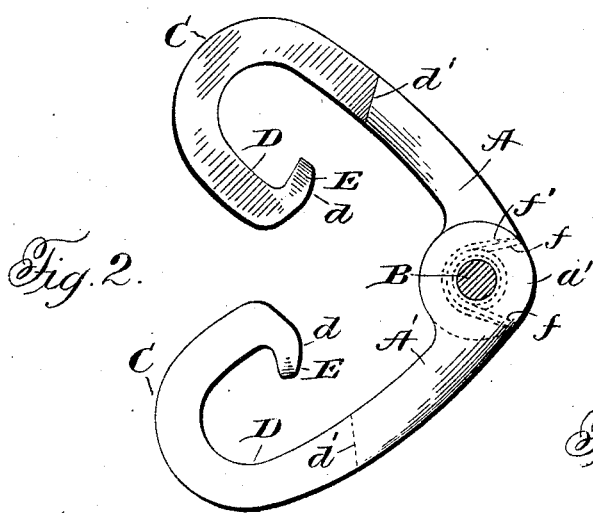
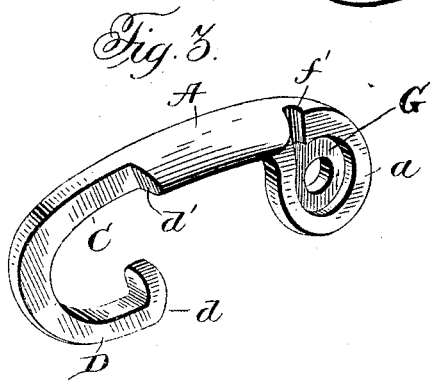
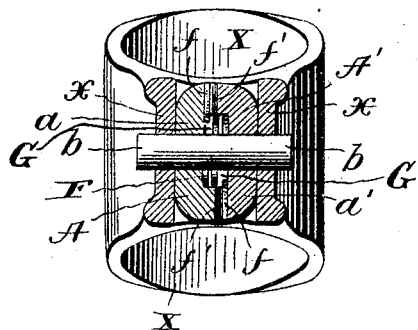
Witnesses:
Jas. E. Hutchinson
Calvin T. Milans
Inventor:
William A. Parrish,
By Bacon & Milans Attorneys

UNITED STATES PATENT OFFICE.

WILLIAM A. PARRISH, OF DECATUR, ILLINOIS.

DETACHABLE LINK.

No. 804,879. Specification of Letters Patent. Patented Nov. 21, 1905.

Application filed March 8, 1904. Serial No. 197,103.

*To all whom it may concern:*

Be it known that I, WILLIAM A. PARRISH, a citizen of the United States, residing at Decatur, in the county of Macon and State of Illinois, have invented certain new and useful Improvements in Detachable Links, of which the following is a specification, reference being had therein to the accompanying drawings.

This invention relates to improvements in detachable links, which, while primarily designed for utilization in connection with the various parts of harness or attachments therefor, are susceptible of many other uses.

The object of the invention is to provide a link of the character designated provided with means for automatically closing the separable portions thereof; also, means for preventing the member to which the link is attached from working toward the pivot end thereof, thereby more effectually maintaining the link in its normal closed position.

Novel details in the construction and arrangement of the several parts of the invention will be apparent from the detailed description hereinafter when read in connection with the accompanying drawings, forming part hereof, and wherein a preferable embodiment of the invention is illustrated.

In the drawings, Figure 1 is a perspective view of the link closed. Fig. 2 is a side view of the link open. Fig. 3 is a perspective view of one of the members of the link, and Fig. 4 is a sectional view through the pivot end of the link.

Referring more specifically to the drawings, wherein like reference characters refer to corresponding parts in the several views, A A' designate overlying hook-shaped members which are provided at their rear ends with pivot-ears $a$ $a'$, through which a pivot-pin B passes, whereby said members are permitted to move laterally upon each other in parallel planes. The opposite ends of said pin B project outwardly from the surfaces of the link, as at $b$, whereby the same may engage the ears $x$ of the clip X or any other device to which the link may be secured. The forward inner portions of the link are reduced, as at C, to provide for the reception of the complementary portions D when the link is closed, as in Fig. 1. The free ends of the portions D are beveled at $d$, so as to engage corresponding shoulders or abutments $d'$ on the opposite member of the link. These free ends are also provided with inwardly-turned lugs E, arranged to prevent the member to which the link is attached working rearwardly toward the pivot end of the link, whereby the normal closed position of the link is the more effectually maintained.

As an additional safeguard against accidental opening of the link and to automatically close the same I provide at the pivot end thereof a spring F, coiled upon the pivot-pin B, and the opposite arms $f$ of which engage seats $f'$ therefor, one in each separable portion of the link, the coiled portion of said spring being seated in recesses G, formed in the adjoining faces of the members A A'.

It is obvious that slight changes may be made in the structural details herein defined without in the least departing from the spirit of the invention.

Having thus described the invention, what is claimed as new, and desired to be secured by Letters Patent, is—

1. A detachable link comprising a pair of overlying members pivotally connected at their rear ends to move upon each other in parallel planes and having forward inner reduced portions terminating in beveled shoulders, the free ends of said members being beveled to abut said shoulders when closed, inwardly-directed extensions on said ends, and a coil-spring surrounding the pivot and having its ends engaging said members and normally serving to maintain them in a closed position.

2. A detachable link comprising a pair of overlying hooked-shaped members pivotally connected at their rear ends to move laterally toward and from each other and having forward inner reduced portions terminating in beveled shoulders, the free ends of said members being beveled to abut said beveled shoulders when closed, inwardly-directed extensions on said ends, and a spring for automatically closing said members.

In testimony whereof I affix my signature in presence of two witnesses.

WILLIAM A. PARRISH.

Witnesses:
E. S. PARKS,
F. R. GOODE.